E. THIEL.
NURSING PAIL.
APPLICATION FILED JULY 22, 1913.
1,126,316.
Patented Jan. 26, 1915.
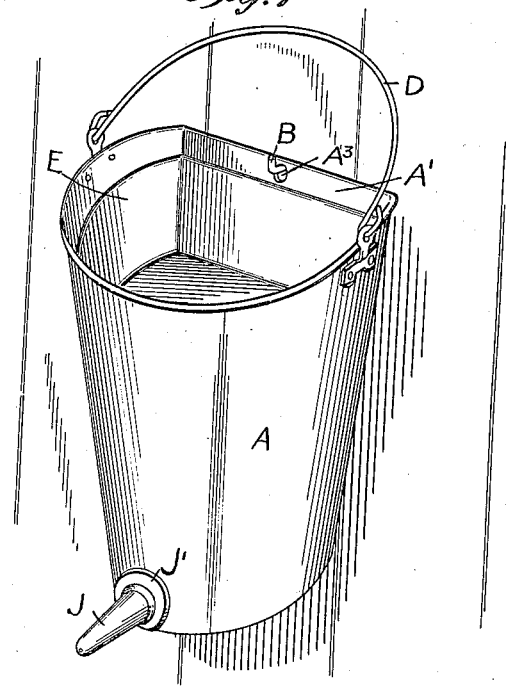
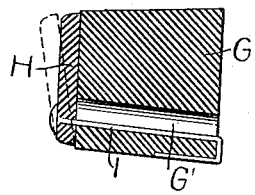
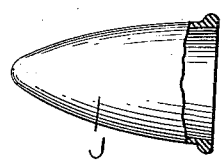
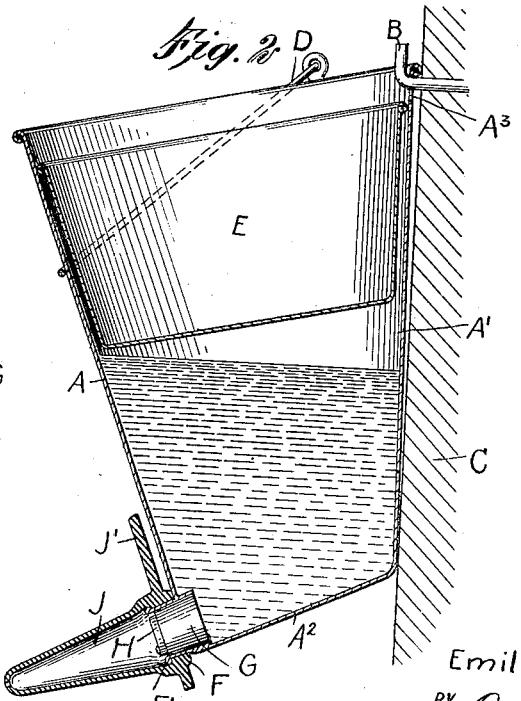
WITNESSES
INVENTOR
Emil Thiel
BY
ATTORNEYS

UNITED STATES PATENT OFFICE.

EMIL THIEL, OF MEDFORD, WISCONSIN.

NURSING-PAIL.

1,126,316.

Specification of Letters Patent.

Patented Jan. 26, 1915.

Application filed July 22, 1913. Serial No. 780,460.

*To all whom it may concern:*

Be it known that I, EMIL THIEL, a citizen of the United States, and a resident of Medford, in the county of Taylor and State of Wisconsin, have invented a new and Improved Nursing-Pail, of which the following is a full, clear, and exact description.

The object of the invention is to provide a new and improved nursing pail more especially designed for nursing calves, colts and other animals, and arranged to insure proper feeding of the animal without danger of inducing colic or other afflictions by too rapid incorrect feeding.

In order to accomplish the desired result, use is made of a pail provided with a valved outlet, and a rubber nipple on the said outlet.

A practical embodiment of the invention is represented in the accompanying drawings forming a part of this specification, in which similar characters of reference indicate corresponding parts in all the views.

Figure 1 is a perspective view of the pail provided with a nipple for use when feeding calves; Fig. 2 is a sectional side elevation of the same; Fig. 3 is an enlarged sectional side elevation of the suction valve; and Fig. 4 is an enlarged side elevation, partly in section, of a rubber nipple for use on the valved outlet when feeding colts.

The body A of the pail is provided with a flat back A′ and a forwardly and downwardly inclined bottom A², and the said body A is provided near the upper end of the back A′ with an opening A³ for conveniently hanging the pail on a nail, hook or other similar support B driven into a wall or a post C for the back A′ to rest on to hold the pail against sidewise movement. The body A is also provided with a bail D for carrying the pail about. The body A is preferably made tapering, as plainly indicated in Figs. 1 and 2, and in the upper end of the body is removably set a small receptacle E adapted to contain hay or other solid food. The receptacle E serves to close the upper part of the pail and as a feed trough.

The body A is provided at the front adjacent the lowest point of the bottom A² with a tubular outlet F containing a valve plug G having an outlet G′ normally closed by a suction valve H held against the outer face of the valve plug G by a spring I, preferably in the form of a rubber band extending through an opening G′, and having its inner end glued or otherwise attached to the plug G. By the arrangement described, the suction valve H is normally in a closed position to prevent the flow of the milk or other liquid food contained in the lower portion of the body A of the pail.

The outlet F projects a distance beyond the face of the pail body A, and the outer end terminates in a flange F′, and the said outer end of the outlet F is adapted to be engaged by a rubber nipple J. Now when the animal sucks on the nipple J the suction valve opens to allow the liquid food to flow from the body A through the opening G′ into the nipple J and to the mouth of the animal, and as soon as the suction ceases the valve H swings back into closed position to stop the outflow of the milk for the time being, that is, until the next suction action takes place on the part of the animal.

Different sized and shaped nipples J are used for different animals; for instance, as shown in Figs. 1 and 2, the nipple J is for use when feeding calves, while the nipple J illustrated in Fig. 4 is intended for use when feeding colts, the nipples being shaped to correspond to the nipples of the mothers of the animals. The nipple J shown in Figs. 1 and 2 is also preferably provided at the base end with a flange J′ so as to protect the snout of the calf during the feeding operation.

The nursing pail shown and described is very simple and durable in construction, and by the arrangement described the liquid food is practically all drained out of the pail by way of the suction valve when the latter is opened.

Having thus described my invention, I claim as new and desire to secure by Letters Patent:

1. A nursing pail, comprising a tapering body open at its upper larger end and having a flat rear wall and an inclined bottom extending downwardly and forwardly from the flat back wall, the pail being provided at its upper end with a bail and means for suspending it with its flat wall against a support, and with a valve controlled and nipple carrying outlet at its lower front side.

2. A nursing pail, comprising a tapering body having a flat rear wall and provided at its upper end with means by which it may be hung upon a support with its flat rear wall against the support and at its lower end on the front side thereof with a nipple carrying tubular projection, and a receptacle corresponding in shape to the pail and fitting into the upper end thereof, said receptacle serving as a closure for the pail and as a feed trough.

In testimony whereof I have signed my name to this specification in the presence of two subscribing witnesses.

EMIL THIEL.

Witnesses:
M. W. RYAN,
T. G. JEFFERS.